US012766360B2

(12) United States Patent
Baker

(10) Patent No.: US 12,766,360 B2
(45) Date of Patent: Oct. 20, 2026

(54) REAR GUARD FOR A TREADMILL

(71) Applicant: Peloton Interactive, Inc., New York, NY (US)

(72) Inventor: Matthew Baker, New York, NY (US)

(73) Assignee: Peloton Interactive, Inc., New York, NY (US)

( * ) Notice: Subject to any disclaimer, the term of this patent is extended or adjusted under 35 U.S.C. 154(b) by 174 days.

(21) Appl. No.: 18/328,498

(22) Filed: Jun. 2, 2023

(65) Prior Publication Data

US 2023/0390601 A1 Dec. 7, 2023

Related U.S. Application Data

(60) Provisional application No. 63/348,245, filed on Jun. 2, 2022.

(51) Int. Cl.

| | |
|---|---|
| ***A63B 22/02*** | (2006.01) |
| ***A63B 71/00*** | (2006.01) |
| ***B66B 29/02*** | (2006.01) |
| ***B66B 29/06*** | (2006.01) |

(52) U.S. Cl.

CPC .......... *A63B 22/0285* (2013.01); *A63B 22/02* (2013.01); *A63B 71/0054* (2013.01); *B66B 29/02* (2013.01); *B66B 29/06* (2013.01); *A63B 22/0235* (2013.01); *A63B 2209/00* (2013.01)

(58) Field of Classification Search

None

See application file for complete search history.

(56) References Cited

U.S. PATENT DOCUMENTS

| | | | | |
|---|---|---|---|---|
| 3,137,382 | A * | 6/1964 | Conover | B66B 29/06 198/325 |
| 3,315,777 | A * | 4/1967 | Margles | B66B 29/06 198/325 |
| 3,331,491 | A * | 7/1967 | East | B66B 23/14 198/840 |
| 3,687,257 | A * | 8/1972 | Johnson | B66B 29/06 198/325 |
| 10,010,748 | B1 * | 7/2018 | Weinstein | A63B 22/0285 |
| 2008/0176719 | A1 * | 7/2008 | To | A63B 22/0235 482/54 |
| 2018/0133544 | A1 * | 5/2018 | Yoo | A63B 22/0214 |
| 2018/0237271 | A1 * | 8/2018 | Park | B66B 29/06 |
| 2021/0394014 | A1 * | 12/2021 | Fima | A63B 71/0622 |

* cited by examiner

*Primary Examiner* — Shila Jalalzadeh Abyaneh

(74) *Attorney, Agent, or Firm* — AMPACC Law Group, PLLC

(57) ABSTRACT

A treadmill or other exercise machine having a comb guard is described. For example, an assembly having a comb guard (e.g., an interlaced comb guard) may be disposed at a rear area of a treadmill. The comb guard may deflect objects or debris away from a gap between a moving surface of the treadmill and a rear guard or housing, and thus displace or move objects away from the moving surface of the treadmill.

13 Claims, 10 Drawing Sheets

Section A-A'

REAR GUARD FOR A TREADMILL

CROSS REFERENCE TO RELATED APPLICATIONS

This application claims priority to U.S. Provisional Patent Application No. 63/348,245, filed on Jun. 2, 2022, entitled TREADMILL WITH REAR GUARD, which is hereby incorporated by reference in its entirety.

BACKGROUND

People perform various exercise activities on exercise machines, often within an indoor environment, such as their home, a gym or fitness club, a training facility, and so on. For example, people run on a treadmill or other exercise machine having a moving surface controlled by a motor. The moving surface, or running surface, upon which a person walks or runs moves over or around a deck or other supporting assembly. The moving surface can be a belt-based surface, a slat-based surface, or other type of surface that moves around the deck, enabling a person (e.g., a runner) to walk, jog, and/or run at different speeds or inclines.

BRIEF DESCRIPTION OF THE DRAWINGS

Embodiments of the present technology will be described and explained through the use of the accompanying drawings.

Figure 1A:
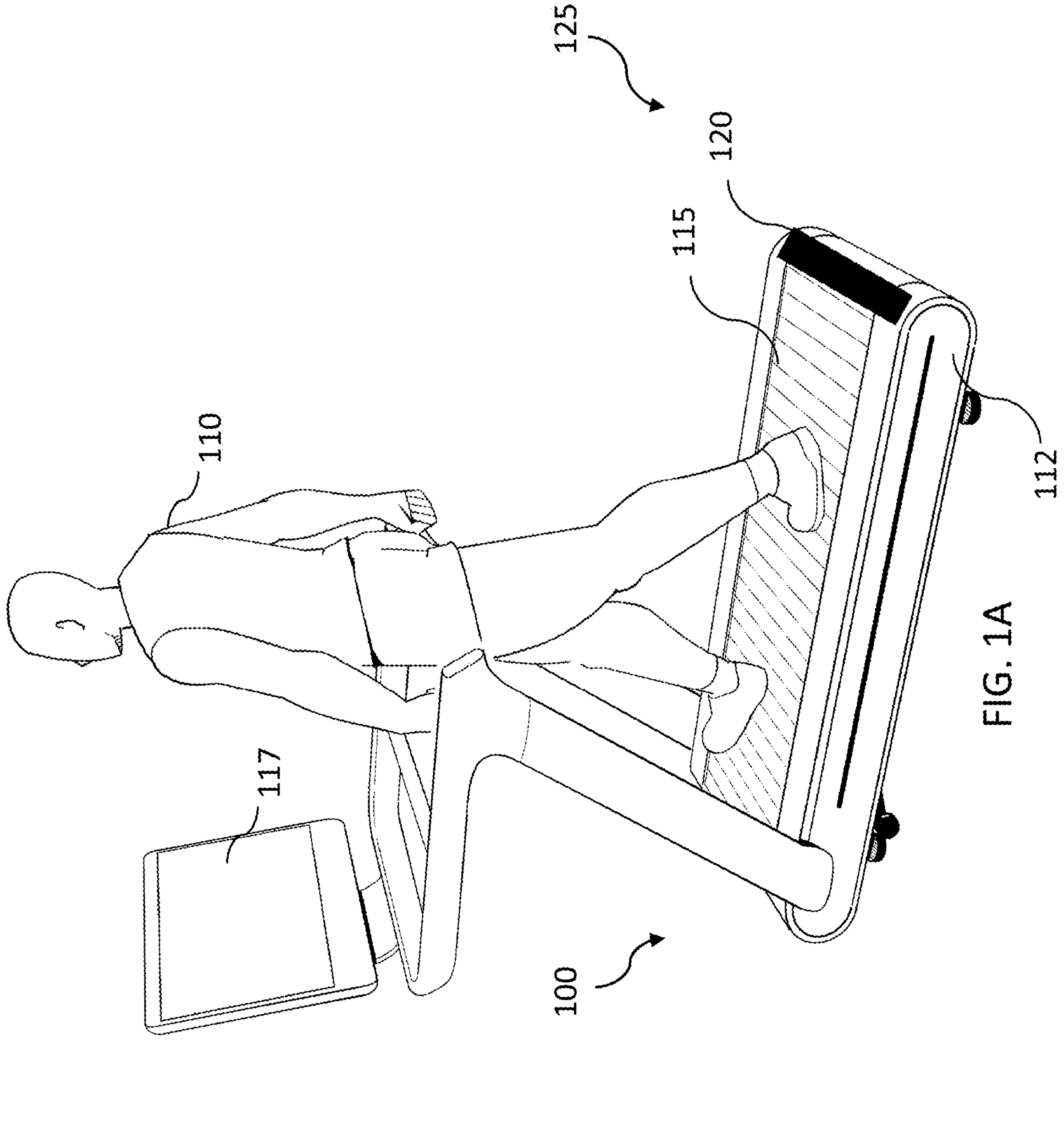
FIG. 1A is a diagram illustrating a treadmill having a comb guard.

In the drawings, some components are not drawn to scale, and some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Overview

The devices, systems, methods, and apparatuses are directed to exercise machines, such as a treadmill or other exercise machine having a moving surface controlled by a motor.

In some cases, adding or utilizing a guard and covering the moving surface of a treadmill can be effective to protect against moving surface hazards associated with the moving surface. However, issues can arise when deploying a guard, such as issues associated with gaps or other openings between the guard and various moving components of an exercise machine, such as a guard. For example, debris can travel from the surface into the guard via gaps between an edge of the guard and the moving surface, among other issues.

A rear assembly having a comb guard (e.g., an interlaced comb guard) can mitigate such issues associated with utilizing guards, such as the guards that introduce gaps between components of a treadmill or other exercise machine. For example, the comb guard may deflect objects or debris away from a gap (e.g., a 1-2 millimeter (mm) wide gap), and thus displace or move objects away from a moving surface of a treadmill without binding the moving surface to the guard.

Various embodiments of the apparatuses, devices, systems, assemblies, and methods will now be described. The following description provides specific details for a thorough understanding and an enabling description of these embodiments. One skilled in the art will understand, however, that these embodiments may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments.

Examples of a Comb Guard for a Treadmill

In some embodiments, a rear assembly, such as an assembly, guard, or guard assembly, is attached or otherwise fixed to a treadmill, such as to a rear or back portion of the treadmill. The rear assembly prevents objects or debris from moving into or under the treadmill by a moving belt or slat-based surface.

FIG. 1A is a diagram illustrating a treadmill 100 having a comb guard. As depicted in FIG. 1A, a runner 110 is running/walking on a moving surface 115 that moves or travels around a deck 112 of the treadmill 100. The runner 110 may be running or walking as part of a workout guided by the treadmill (e.g., a class presented by a display 117 of the treadmill) and/or running/walking without any guidance and maintaining their own pace or workout parameters.

In some embodiments, the treadmill includes a comb assembly 120, or comb guard, which may be disposed or placed at a rear area 125 of the treadmill 100. The comb assembly 120, as described herein, can include a comb-like edge or interface that receives the moving surface 115 as the moving surface rotates and moves towards a rear of the treadmill 100.

Figure 1B:
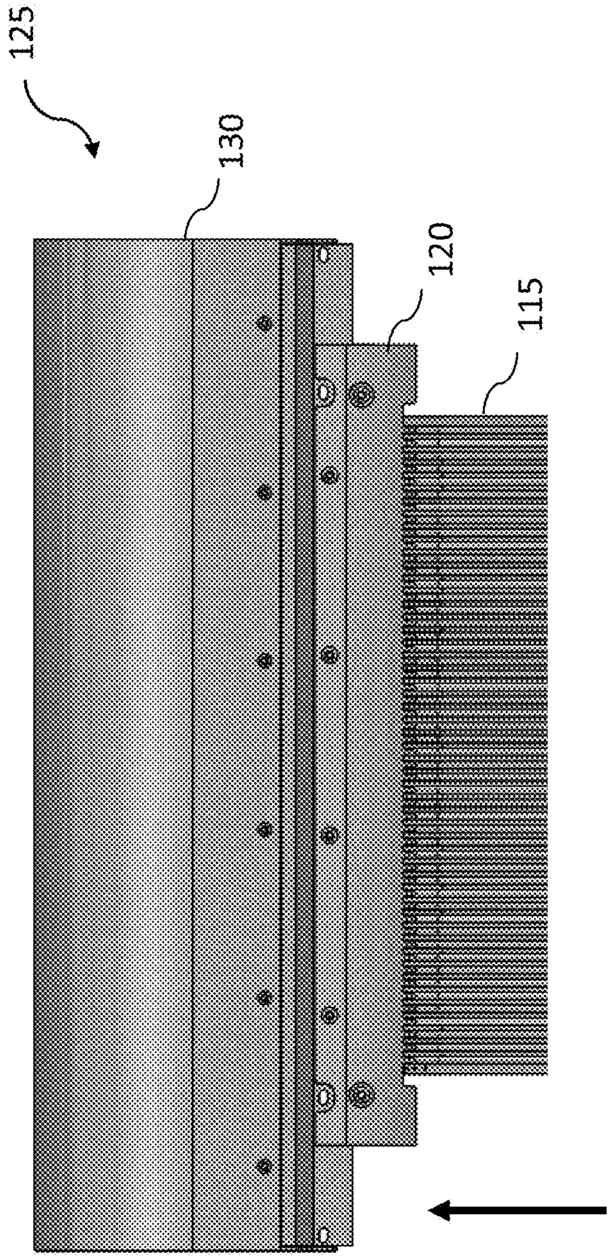
FIG. 1B is a diagram illustrating a rear area of a treadmill having a comb guard.

As shown in FIG. 1B, which illustrates the rear area 125 of the treadmill 100 (e.g., a top view), the treadmill includes a guard 130 or cover, the comb assembly 120, and the moving surface 115. The moving surface 115 moves past or via the comb assembly 115 into the guard 130, which is positioned to protect a rear end of the treadmill 100 (e.g., by covering the moving surface 115 as it travels around and under the deck 112 of the treadmill 100).

In some cases, the comb assembly 120 may be detachably coupled to the guard 110 by a set of screws, or other attachment devices, to facilitate maintenance, cleaning, replacement, and so on.

Figure 1C:
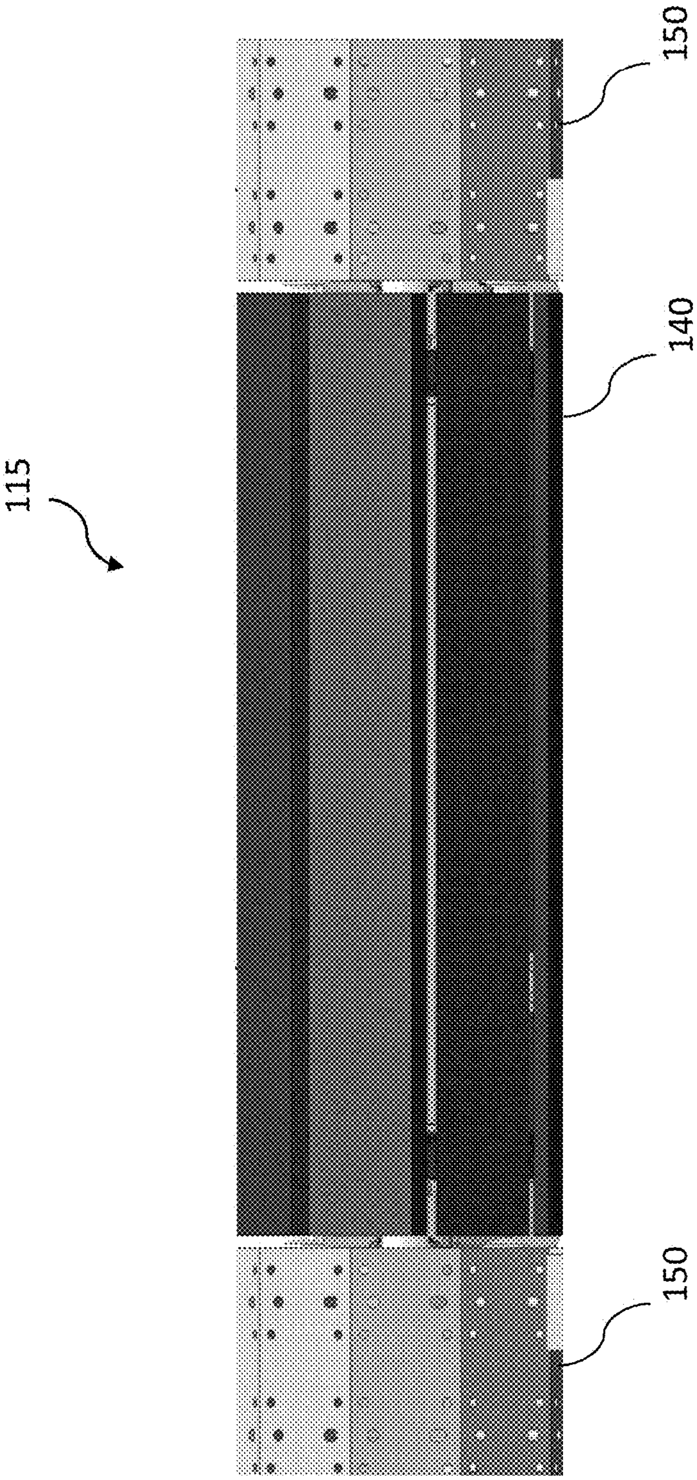
FIG. 1C is a diagram illustrating a rear view of a slat-based treadmill.

As described herein, in some cases, the moving surface 115 is a slat-based surface. FIG. 1C illustrates a rear view of the treadmill 100. The moving surface 115 includes a series of connected slats 140, where a long axis of the slats 140 is oriented transverse to the direction of travel of the moving surface 115. The slats 140 can be disposed between and spaced apart from side assemblies 150 on both sides of the moving surface 115. Of course, the moving surface 115, in various embodiments, can be a belt and/or include one or more layers.

Figure 2A:
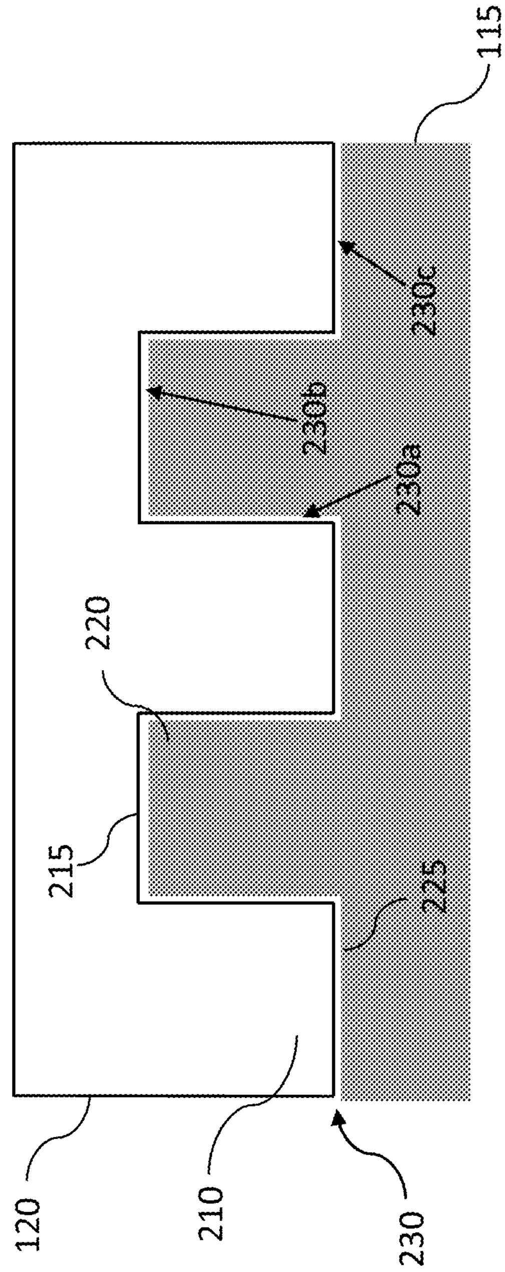
FIGS. 2A-2C are diagrams illustrating an interface between a comb guard and a moving surface of a treadmill.

FIG. 2A illustrates an interface between the comb guard 120 and the moving surface 130. The comb guard 120 may include multiple tines, teeth, or protrusions 210, which can extend from a surface or base of the comb guard 120 and are separated from each other by channels 215.

In assembly, the protrusions 210 of the comb guard 120 are interdigitated or interlaced with corresponding ridges 220 on the moving surface 115. Accordingly, the protrusions 210 are located within channels 225 of the moving surface 115, and the ridges 220 of the moving surface 115 are located within the channels 215 of the comb guard 120.

In some cases, the protrusions 210 of the comb guard 120 may be spaced apart from surfaces of the channels 225 of the moving surface 115 by gaps 230, and vice versa. Side surfaces of ridges 220 may be spaced apart from side surfaces of protrusions 210 by gaps 230*a*, top surfaces of ridges 220 may be spaced apart from the bottom of channels 225 by gaps 230*b*, and top surfaces of protrusions 210 may be spaced apart from the bottom of channels 225 by gaps 230*c*. The size of these gaps 230 may be the same or different from each other.

Figure 2B:
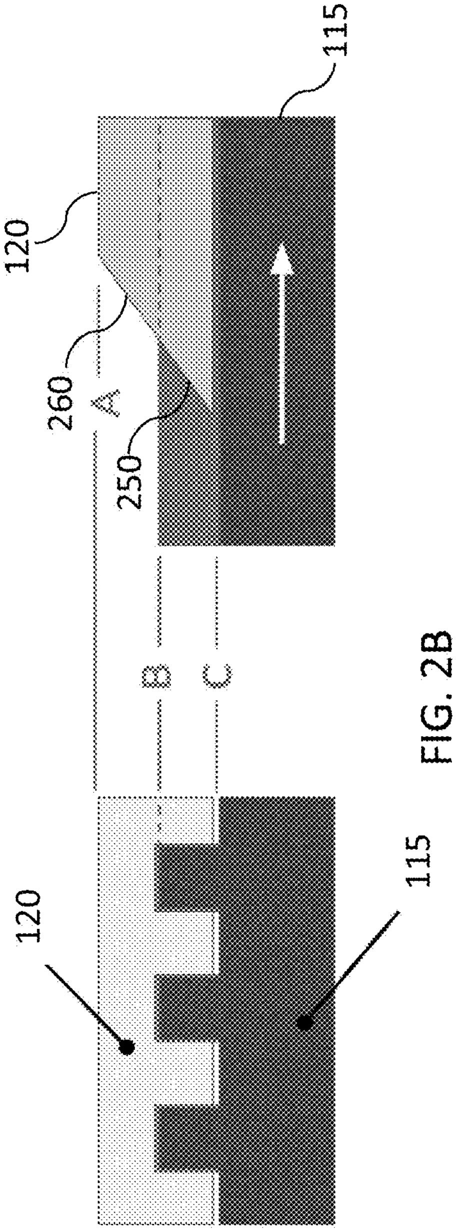
Figure 4A:
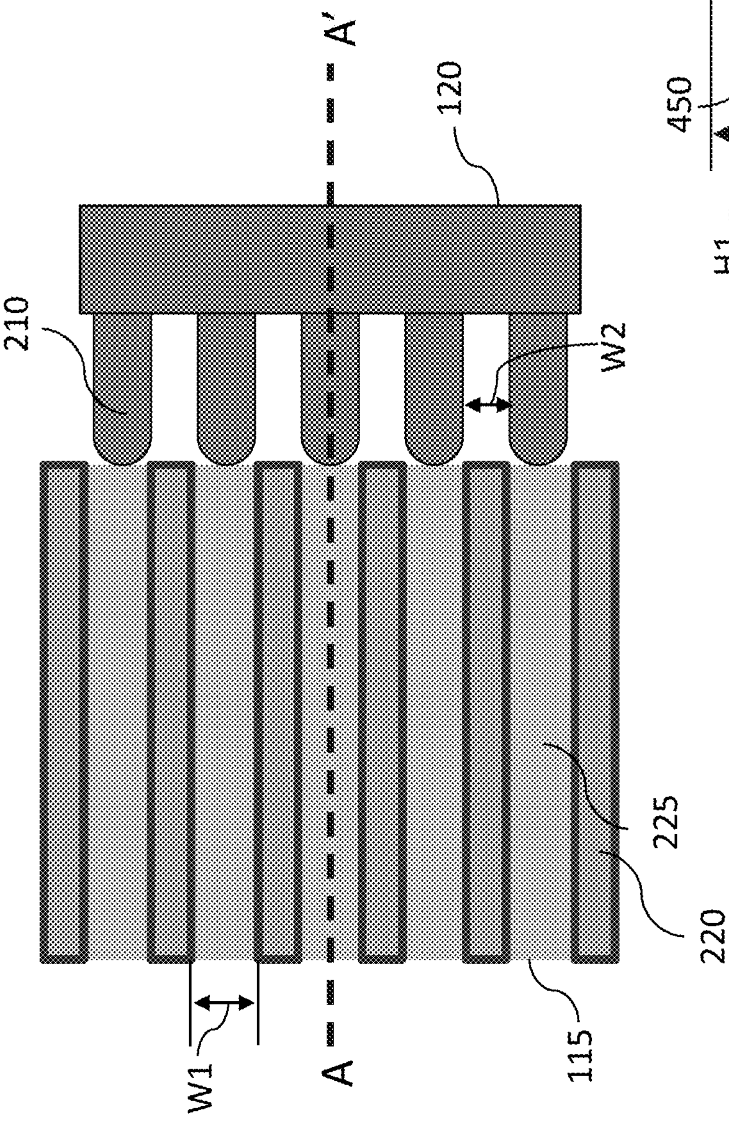
FIGS. 4A-4B are diagrams illustrating another interface between a comb guard and a moving surface of a treadmill.

FIG. 2B shows a side cross-sectional view of the interface between the comb guard 120 and the moving surface 115. A forward surface or leading edge 250 of the protrusions 210 of the comb guard 120 is angled or raked with respect to the moving surface 115 such that bottom portions of the protrusions 210 extend further into the channels 225 than top portions. Similarly, the leading edge 260 of a portion of the comb guard 120 above channels 215 in FIG. 4A is angled or raked with respect to upper and lower surfaces of the moving surface 130.

In various embodiments, the angle may be from 10 degrees to 80 degrees with respect to the direction of travel of the moving surface 115. For example, the angle may be 20 degrees, 30 degrees, 45 degrees, 60 degrees, or 70 degrees, or within a range of any two of these angles. Lower angles may provide greater lift when particles are encountered, while steeper angles are less prone to damage, easier to manufacture, and occupy less volume.

Figure 2C:
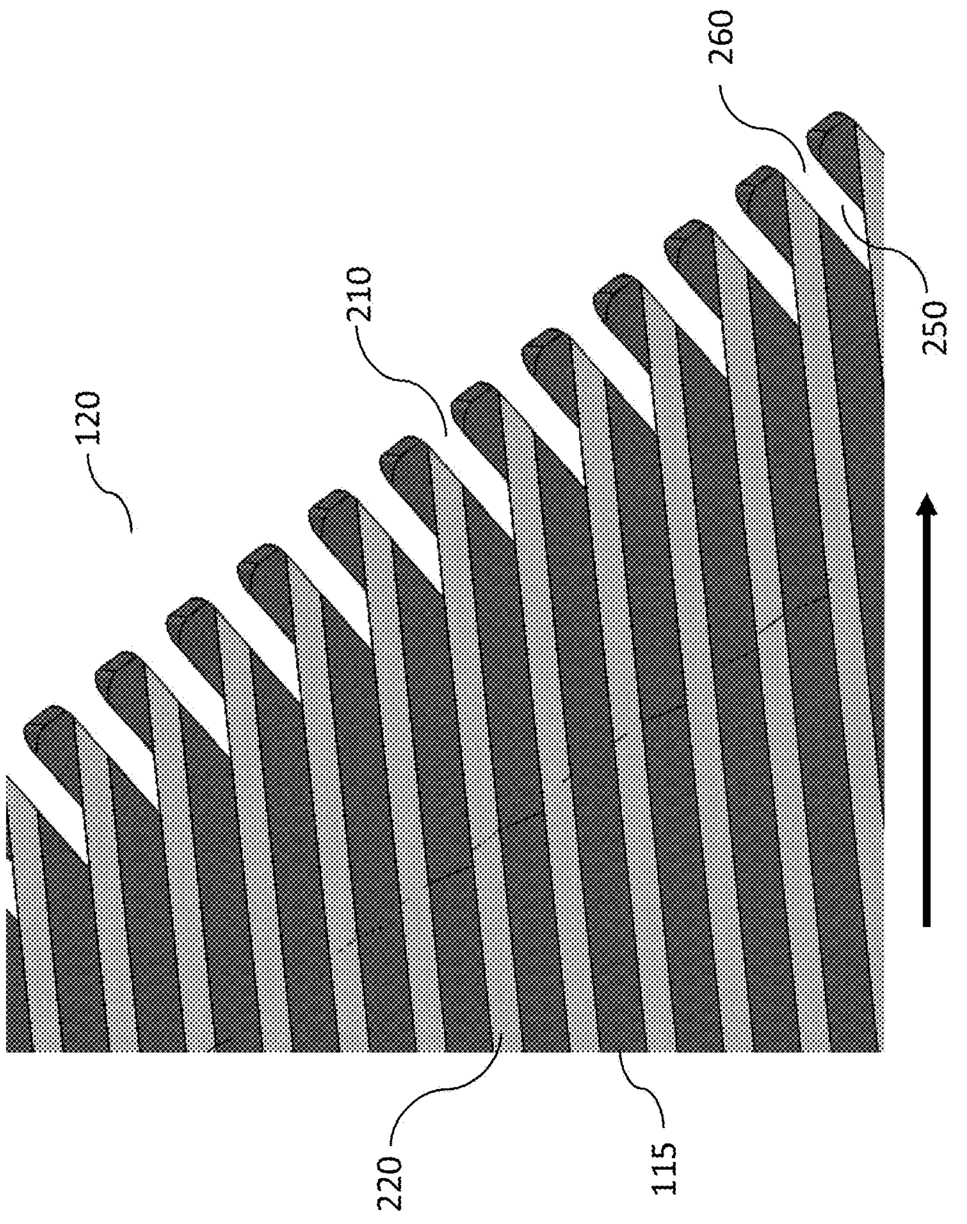

Thus, when an object on the moving surface 115 encounters the comb guard 120, the momentum of the object carries it into the leading edge 250 which lifts the object off the moving surface such that the object does not pass into the interface (and into the guard 130 or other area of the treadmill). For example, FIG. 2C illustrates movement of the moving surface 115 into the interface with the comb guard 120.

In some embodiments, the moving surface 115 and comb guard 120 may have interlacing grooves that allow a lowest point of the fingers (C) on the comb to always sit below the surface (B), which can be the highest point on the moving surface. Objects on the moving surface 115 that approach the interlacing grooves will be scooped up from underneath by the comb guard 120 and directed up to the top of the comb (A) and off the moving surface 115.

Figure 3:
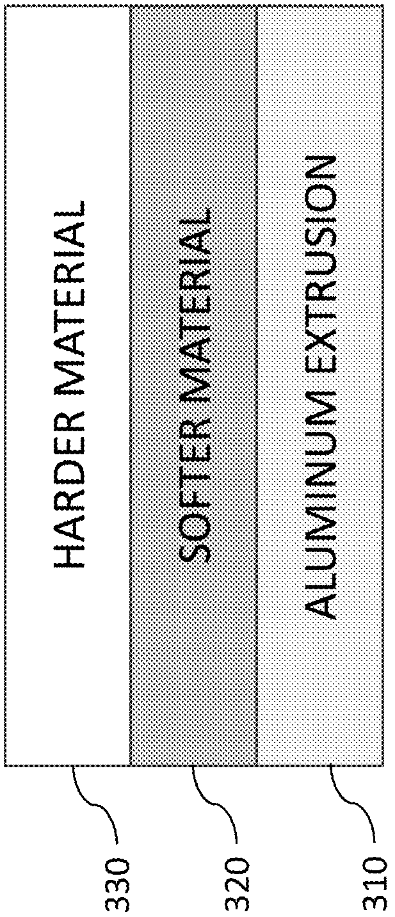
FIG. 3 is a diagram illustrating an example slat for a treadmill.

FIG. 3 illustrates an arrangement of different material layers present in slats of the moving surface 115. A lowermost layer 310 may be an aluminum extrusion, and/or may comprise a material with relatively high rigidity, such as a metal material, a composite material, or an engineered plastic.

A second, or middle, layer 320 may be a relatively soft material, such as a medium or low durometer rubber. In some cases, the second layer 320 can provide elasticity or cushioning, to dampen the impact of running by a user, and the soft material may have a fast recovery rate to minimize the duration for which it is deformed by a footfall.

An upper layer or surface 330 may be an outermost surface and may comprise a polymer material with a durometer and modulus of elasticity than is higher than the second layer 320. Thus, the slats can include various layers that provide structure, support, cushioning, and/or protection for the moving surface 115 and a person running on the treadmill 100.

Figure 4B:
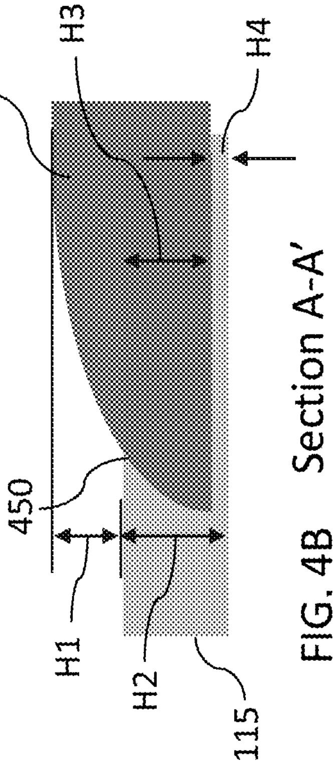

FIGS. 4A-4B illustrate another interface between the moving surface 115 and the comb guard 120, in which FIG. 4B is a cross-sectional view taken along cross section A-A' of FIG. 4B. As shown, protrusions 210 of the comb guard 120 have a leading edge 450 that is curved in a convex direction and has a generally parabolic shape. In various embodiments, the leading edge 450 may be flat or curved in a convex or concave orientation, and the incline of a curve or angle of the leading edge may decrease to approach horizontal in the direction of travel of the moving surface 115. Although the forward or leading edge 450 of the protrusions 210 in FIG. 7A is shown as having a convex radius, in other embodiments the forward or leading edge 450 may have a concave radius or be substantially flat.

In some embodiments, the width W1 of spaces between opposing faces of adjacent ridges 220 of the moving surface 115 and the width W2 of spaces between opposing faces of adjacent protrusions 210 of the comb guard 120 may be from 5-12 mm. For example, the spaces may be 7 mm, 8 mm, 9 mm or 10 mm. The width of spaces W1 may the same or different from the width of spaces W2.

The height of a portion of protrusions 210 that extends above the channels 225 in the moving surface 115 may be from 0.5 to 5 mm, and in particular, may be 1.0 mm, 1.5 mm, 2.0 mm, 2.5 mm, 3.0 mm, 3.5 mm, 4.0 mm or 4.5 mm. The height of space H4 between the base of channel 134 and the base of protrusion 210 may be from 0.5-3 mm, and may be 1.0 mm, 1.5 mm, 2.0 mm, 2.5 mm. The height H2 of ridges 220 may be from 3 to 8 mm, and in particular, may be 3.5 mm, 4.0 mm, 4.5 mm, 5.0 mm, 5.5 mm, 6.0 mm, 6.5 mm or 7.0 mm. The height H3 is the difference between H4 and H2.

Figure 5A:
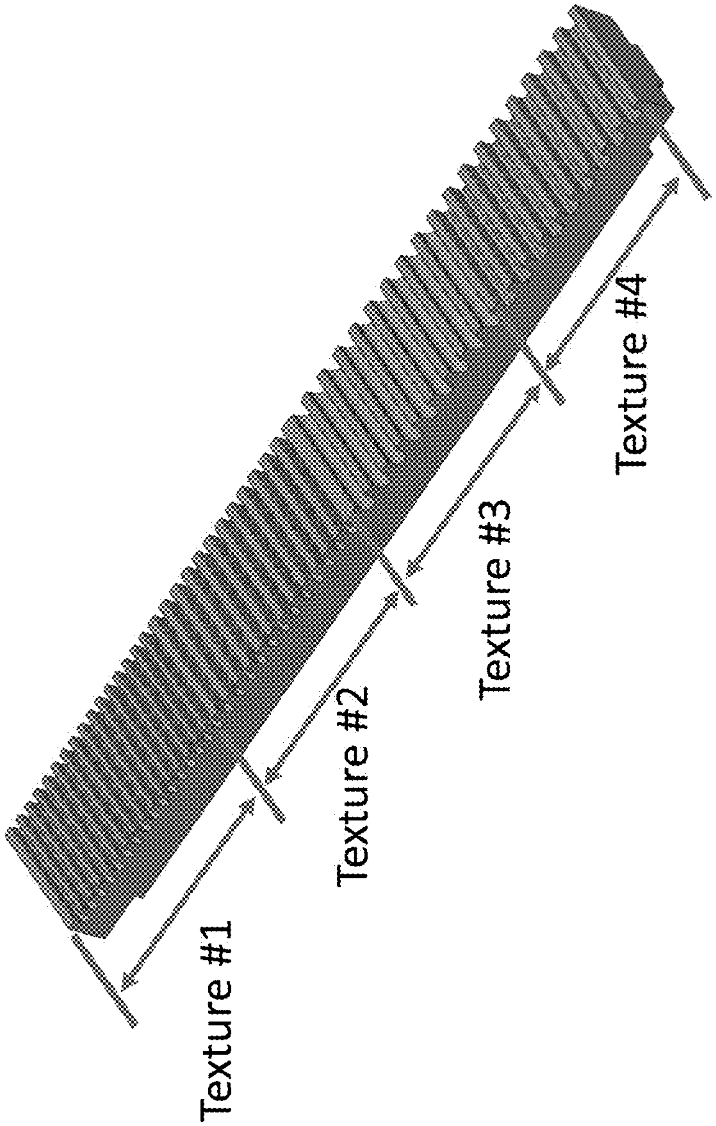
FIGS. 5A-5C are diagrams illustrating various textures of a moving surface for a treadmill having a comb guard.
Figure 5B:
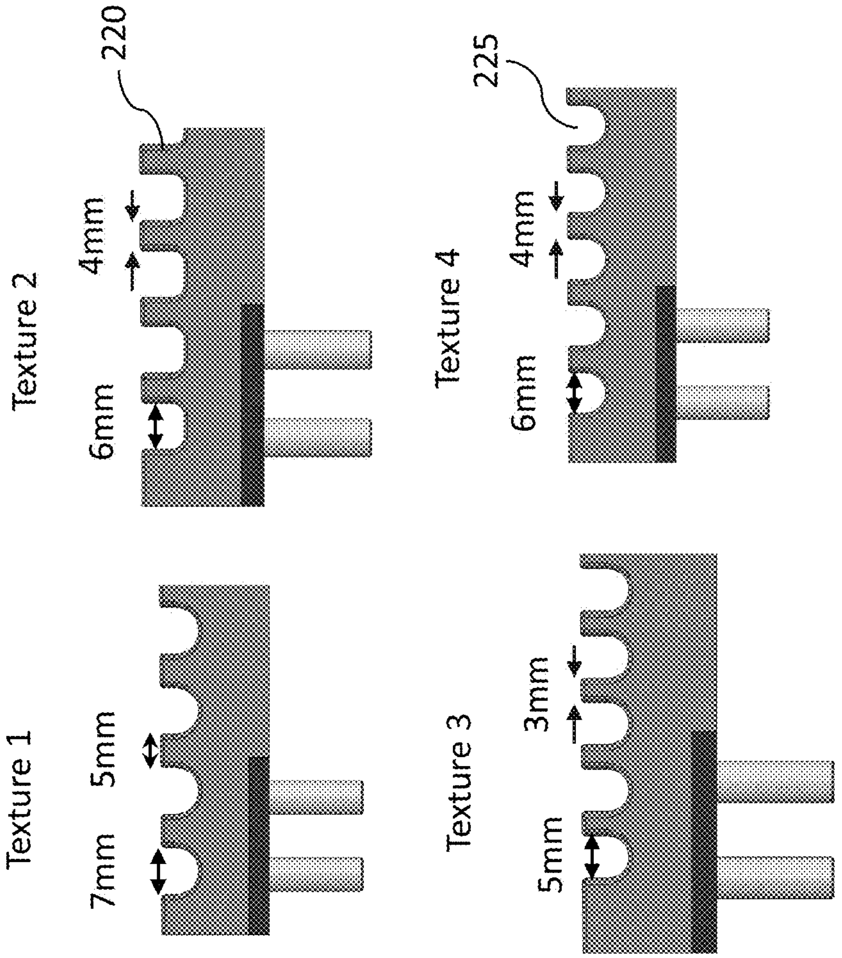
Figure 5C:
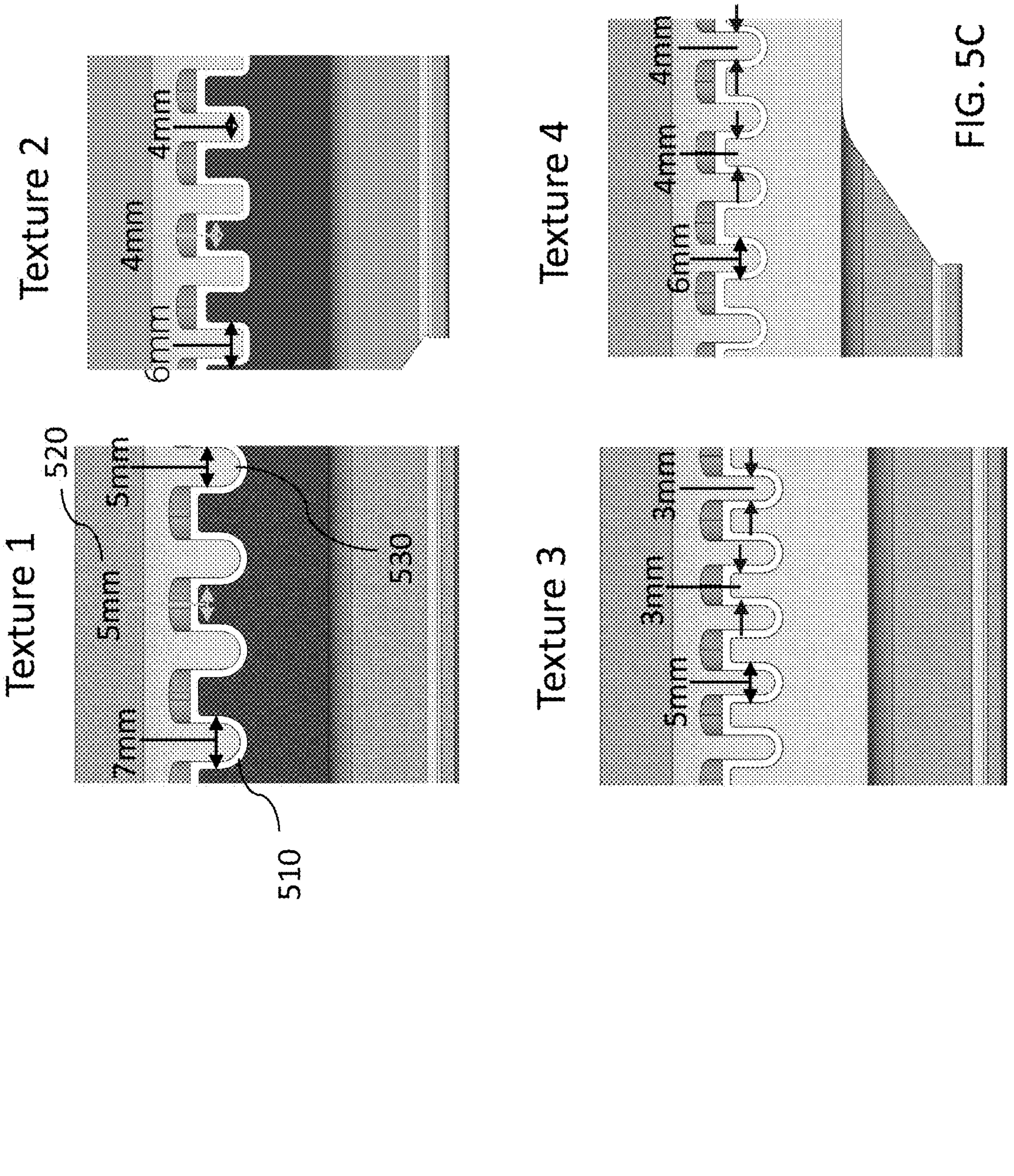

FIGS. 5A-5C illustrate various textures for an upper surface of the moving surface 115. As shown, the moving surface 115 (and/or various slats) can include various textures or ridge geometries.

For example, FIG. 5B depicts a cross-sectional view of the four textures presented in FIG. 5A, along with dimensions for the channels 225 and the ridges 220. As shown in Texture 1, the bases of channels 225 may have a rounded or semicircular shape. As shown in Texture 2, the bases of channels 225 are substantially flat with radiused corners. Textures 3-4 introduce additional relative dimensions (e.g., varying between 2-7 mm).

FIG. 5C depicts the different textures of the moving surface 115 in context with the interface with the comb guard 120, as described herein. The dimensions presented include a width 510 of a channel 225, a width 520 of a ridge 220, and a width 530 of a protrusion 210.

As shown in FIG. 5C, there can be 1 mm gaps between contours of the moving surface 115 and contours of the comb guard 120. Of course, the interface can include various dimensions, widths, and/or relative spacings, such as gaps that are sized between 0.5 mm to 3.0 mm (e.g., 1.5 mm, 2.0 mm, 2.5 mm, or 3.0 mm).

Thus, in various embodiments, a treadmill can employ and/or include a comb guard, such as in combination with a rear guard and/or rear guard assembly. The treadmill, such as the treadmill 100, can utilize the comb guard to protect and/or enhance an interface between a moving belt or surface of the treadmill and a guard attached to a rear area and/or proximate to the moving belt or surface, among other benefits.

The treadmill, therefore, can include a moving surface including a plurality of slats coupled to one another, each slat comprising an outer surface that comprises a plurality of ridges longitudinally oriented in a direction of travel of the moving surface, and a plurality of first channels disposed between adjacent ridges, and an inner surface comprising a material with a higher tensile modulus than a material of the outer surface, and a comb guard disposed at a rear end of a deck of the treadmill, the comb guard comprising multiple protrusions, each of the multiple protrusions being separated by a second channel and oriented within a respective first channel, and each of the ridges is oriented within a respective second channel.

In some embodiments, an assembly for a treadmill can include a deck, a moving surface that moves around the deck, a guard assembly that is disposed at a rear area of the deck, and a comb guard that is disposed between a front edge of the guard assembly and the moving surface.

In some embodiments, a guard for a treadmill can include a cover that protects a rear area of a deck of the treadmill and a comb interface that is disposed between the cover and a moving surface of the treadmill. In some cases, the comb interface is integrated into a front edge of the guard, and/or is part of a comb guard that is disposed between the cover and the moving surface of the treadmill. Therefore, the guard, or a rear housing, can include a comb guard or comb interface, such as at a front edge of the guard.

Conclusion

Unless the context clearly requires otherwise, throughout the description and the claims, the words “comprise,” “comprising,” and the like are to be construed in an inclusive sense, as opposed to an exclusive or exhaustive sense; that is to say, in the sense of “including, but not limited to.” As used herein, the terms “connected,” “coupled,” or any variant thereof, means any connection or coupling, either direct or indirect, between two or more elements; the coupling of connection between the elements can be physical, logical, or a combination thereof. Additionally, the words “herein,” “above,” “below,” and words of similar import, when used in this application, shall refer to this application as a whole and not to any particular portions of this application. Where the context permits, words in the above Detailed Description using the singular or plural number may also include the plural or singular number respectively. The word “or”, in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the technology may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the embodiments. Accordingly, the embodiments are not limited except as by the appended claims.

What is claimed is:

1. A treadmill, comprising:

a moving surface including a plurality of slats coupled to one another, each slat comprising:
  an outer surface that comprises:
    a plurality of ridges longitudinally oriented in a direction of travel of the moving surface, and
    a plurality of first channels disposed between adjacent ridges, wherein the plurality of first channels includes at least one channel of a first width and one channel of a second width different from the first width; and
  an inner surface comprising a material with a higher tensile modulus than a material of the outer surface;
a deck; and
a rear assembly including a comb guard, wherein the rear assembly is disposed at a rear end of the deck of the treadmill and configured to partially cover the moving surface as it travels around the deck,
wherein the comb guard comprises multiple protrusions,
wherein each of the multiple protrusions are separated by a second channel and oriented within a respective first channel, and
wherein each of the plurality of ridges is oriented within a respective second channel.

2. The treadmill of claim 1, wherein each of the multiple protrusions includes a first leading edge that is disposed at an angle with respect to a base of the first channel in which it is disposed so that when the moving surface is in motion, objects are lifted from the plurality of first channels by the multiple protrusions.

3. The treadmill of claim 2, wherein portions of the comb guard disposed above the plurality of ridges have second leading edges that are disposed at an angle with respect to top surfaces of the plurality of ridges so that when the moving surface is in motion, objects lying on the top surfaces of the plurality of ridges are lifted.

4. The treadmill of claim 1, wherein gaps between the multiple protrusions and the plurality of first channels and between the plurality of ridges and the second channels have a size that is 2 millimeters or less.

5. The treadmill of claim 1, wherein each slat further comprises:

a middle layer disposed between the outer surface and the inner surface, the middle layer comprising a material with a durometer that is lower than a durometer of the material of the outer surface and a durometer of the material of the inner surface.

6. A treadmill, comprising:

a deck;

a moving surface that moves around the deck, wherein a top surface of the moving surface includes a plurality of ridges longitudinally oriented in a direction of travel of the moving surface and a plurality of first channels disposed between the plurality of ridges, wherein the plurality of first channels include at least one channel of a first width and one channel of a second width different from the first width;

a guard assembly that is disposed at a rear area of the deck and configured to partially cover the moving surface as it moves around the deck; and a comb guard that is disposed between a front edge of the guard assembly and the moving surface, wherein the comb guard includes multiple protrusions configured to interface with the plurality of first channels and a plurality of second channels configured to interface with the plurality of ridges when the moving surface moves around the deck.

7. The treadmill of claim 6, wherein the moving surface is a slat-based belt that moves into the guard assembly as the moving surface moves towards the rear area of the deck.

8. The treadmill of claim 6, wherein the multiple protrusions are angled protrusions.

9. A guard connectable to a treadmill that includes a deck and a moving surface that moves around the deck, the moving surface having a top surface with a plurality of ridges longitudinally oriented in a direction of travel of the moving surface and a plurality of first channels disposed between the plurality of ridge, wherein the plurality of first channels include at least one channel of a first width and one channel of a second width different from the first width, the guard comprising:

a cover configured to be disposed at and protect a rear area of the deck of the treadmill; and a comb interface configured to be disposed between the cover and the moving surface of the treadmill, wherein the comb interface includes multiple protrusions configured to interface with the plurality of first channels of the moving surface and a plurality of second channels configured to interface with the plurality of ridges of the moving surface when the moving surface moves around the deck so as to lift objects disposed on the top surface of the moving surface of the treadmill.

10. The guard of claim 9, wherein the moving surface is a slat-based belt that moves around the deck of the treadmill.

11. The guard of claim 9, wherein the comb interface is integrated into a front edge of the guard.

12. The guard of claim 9, wherein the multiple protrusions are angled protrusions.

13. The guard of claim 9, wherein the guard is removably connected to the deck of the treadmill.

* * * * *